US012581357B2

(12) United States Patent
Uppili et al.

(10) Patent No.: US 12,581,357 B2
(45) Date of Patent: Mar. 17, 2026

(54) LIGHT MOBILE CORE FOR NETWORKS

(71) Applicant: Tambora Systems Singapore Pte. Ltd., Singapore (SG)

(72) Inventors: Anand Uppili, Bangalore (IN); Ganesh Vaidyanathan Ramachandran, Chennai (IN); Mahesh Kumar Onkarappa Chindi, Bengaluru (IN); Raghu Govardhana, Bengaluru (IN); Vikas Dayanand Warad, Bangalore (IN); Vijay Kumar J N, Bengaluru (IN)

(73) Assignee: Tambora Systems Singapore Pte. Ltd, Singapore (SG)

( * ) Notice: Subject to any disclaimer, the term of this patent is extended or adjusted under 35 U.S.C. 154(b) by 475 days.

(21) Appl. No.: 17/960,887

(22) Filed: Oct. 6, 2022

(65) Prior Publication Data

US 2023/0136134 A1 May 4, 2023

(51) Int. Cl.
*H04W 28/02* (2009.01)
*H04W 36/22* (2009.01)

(52) U.S. Cl.
CPC ....... *H04W 28/0289* (2013.01); *H04W 36/22* (2013.01)

(58) Field of Classification Search
None
See application file for complete search history.

(56) References Cited

U.S. PATENT DOCUMENTS

| | | | | |
|---|---|---|---|---|
| 8,612,612 B1* | 12/2013 | Dukes | ................... | H04L 67/141 |
| | | | | 709/203 |
| 2011/0075675 A1* | 3/2011 | Koodli | .................. | H04M 15/41 |
| | | | | 370/401 |
| 2012/0140624 A1* | 6/2012 | Denman | ................. | H04L 47/22 |
| | | | | 370/230.1 |
| 2012/0158947 A1* | 6/2012 | Hassan | ............. | H04M 15/8088 |
| | | | | 709/224 |

(Continued)

FOREIGN PATENT DOCUMENTS

| | | | | | |
|---|---|---|---|---|---|
| CN | 103168495 B | * | 3/2016 | ............ | H04W 88/08 |
| CN | 113055908 A | * | 6/2021 | ......... | H04L 67/5682 |

(Continued)

*Primary Examiner* — Edan Orgad
(74) *Attorney, Agent, or Firm* — Anand P Narayan; Yantra Patents LLC

(57) ABSTRACT

Described herein is a method and system for communication in an edge network that interconnects with eNodeB (4G) (108) or gNB (5G) (116). A light mobile core with an IP interface interconnects the edge network with eNodeB (4G) (108) or gNB (5G) (116). Mobile traffic is offloaded at the edge either fully or partially, rather than have the full data ripple through the entire 4G or 5G network to one of the following: Internet, MEC (Multi-Access Edge Compute) platform or a specialized edge cache or edge compute node. The system maintains conformance with 3GPP standards and does not disrupt the S1 interface between eNodeB (108) and EPC (Evolved Packet Core) in 4G networks, and does not disrupt the N3 interface between gNB and core in 5G networks. The system described herein provides the full functionality of 4G or 5G mobile core, and comprises control plane and data plane components.

20 Claims, 4 Drawing Sheets

(56)     References Cited

U.S. PATENT DOCUMENTS

| | | | | |
|---|---|---|---|---|
| 2013/0311630 A1* | 11/2013 | Chastain | ............ | H04L 12/1407 |
| | | | | 709/223 |
| 2014/0040504 A1* | 2/2014 | Gupta | .................... | H04W 4/02 |
| | | | | 370/254 |
| 2015/0222939 A1* | 8/2015 | Gallant | ................ | H04L 43/062 |
| | | | | 725/9 |
| 2015/0319313 A1* | 11/2015 | Lifshitz | ................ | H04W 4/029 |
| | | | | 455/406 |
| 2016/0100330 A1* | 4/2016 | Broustis | ............... | H04W 24/02 |
| | | | | 370/237 |
| 2017/0195132 A1* | 7/2017 | Burgio | .................... | H04L 12/46 |
| 2018/0352501 A1* | 12/2018 | Zhang | .................. | H04W 48/14 |
| 2018/0359337 A1* | 12/2018 | Kodaypak | ........... | H04L 12/1886 |
| 2019/0239270 A1* | 8/2019 | Lee | ....................... | H04W 76/15 |
| 2019/0260641 A1* | 8/2019 | Giust | .................... | H04L 67/141 |
| 2020/0045514 A1* | 2/2020 | Chai | .................... | H04M 15/64 |
| 2020/0092424 A1* | 3/2020 | Qiao | .................. | H04L 12/1407 |
| 2020/0125389 A1* | 4/2020 | Palermo | .............. | H04W 28/084 |
| 2020/0177512 A1* | 6/2020 | Byrne | ................. | H04L 12/1407 |
| 2020/0213909 A1* | 7/2020 | Oh | ....................... | H04L 12/1407 |
| 2020/0245163 A1* | 7/2020 | Jaya | ................... | H04L 47/2475 |
| 2020/0351626 A1* | 11/2020 | Libby | .................. | H04M 15/64 |
| 2021/0329496 A1* | 10/2021 | Koodli | .................. | G06N 20/00 |
| 2022/0278911 A1* | 9/2022 | Padala | ................. | H04L 41/083 |
| 2022/0311768 A1* | 9/2022 | Hoewisch | ........... | H04L 63/0876 |
| 2022/0322199 A1* | 10/2022 | Jang | ...................... | H04W 28/02 |
| 2023/0269184 A1* | 8/2023 | Zemach | ................. | H04L 49/15 |
| | | | | 370/235 |
| 2023/0396555 A1* | 12/2023 | Kasichainula | ...... | H04L 47/6275 |
| 2023/0397046 A1* | 12/2023 | Sahin | ............... | H04W 28/0865 |
| 2023/0412423 A1* | 12/2023 | Krovatkina | .......... | H04L 45/655 |

FOREIGN PATENT DOCUMENTS

| | | | | | |
|---|---|---|---|---|---|
| CN | | 114978286 A | * | 8/2022 | ........ H04B 7/18521 |
| WO | WO-2024030967 A1 | * | 2/2024 | ........ H04W 28/0278 |

* cited by examiner

102
101
4G
Internet 106
104
Existing PGW
Existing AAA, PCRF, OCS, OFCS
105
Existing MME
Existing SGW
107
S1
108
GTP control messages
eNodeB
109
110
Data path
UE

111
5G
102
Internet
112
113
114
Existing SMF
Existing UPF
Existing OSS components
Existing AMF
115
N3
GTP control messages

116
gNB
(PRIOR ART)
109
110
Data path
UE

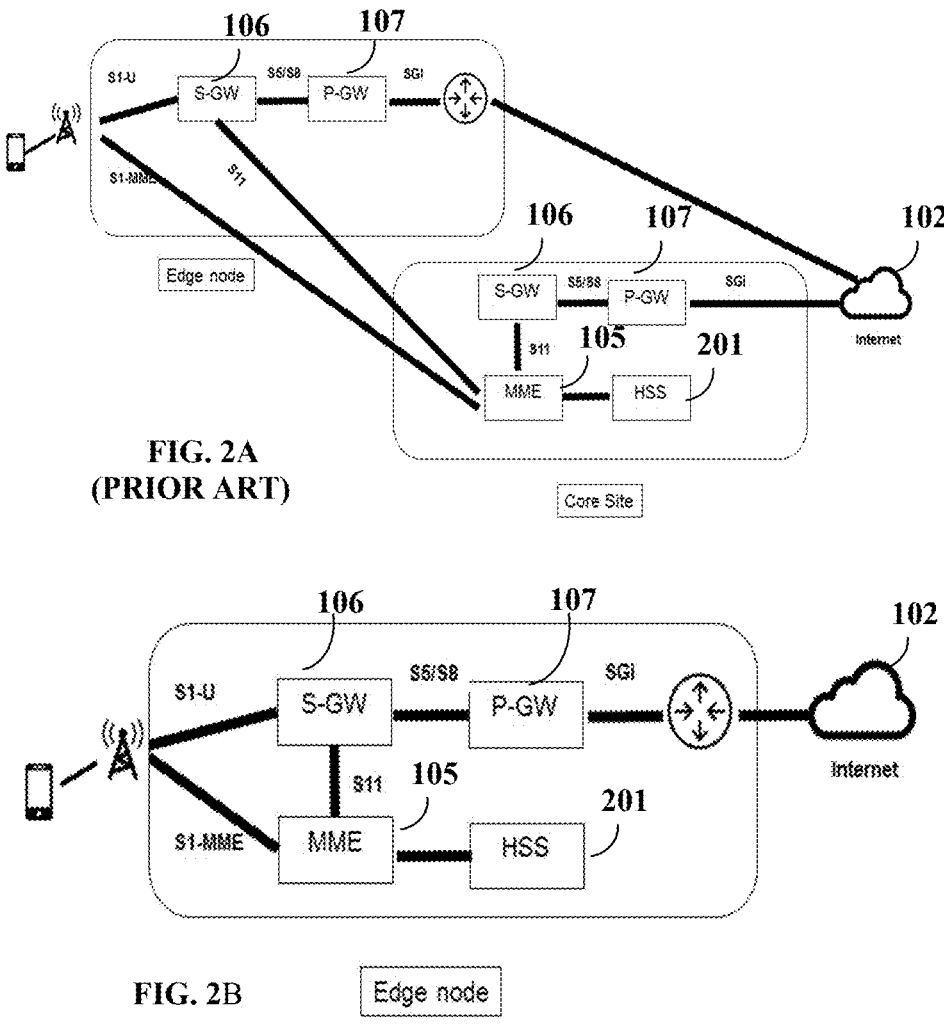
FIG. 2A
(PRIOR ART)
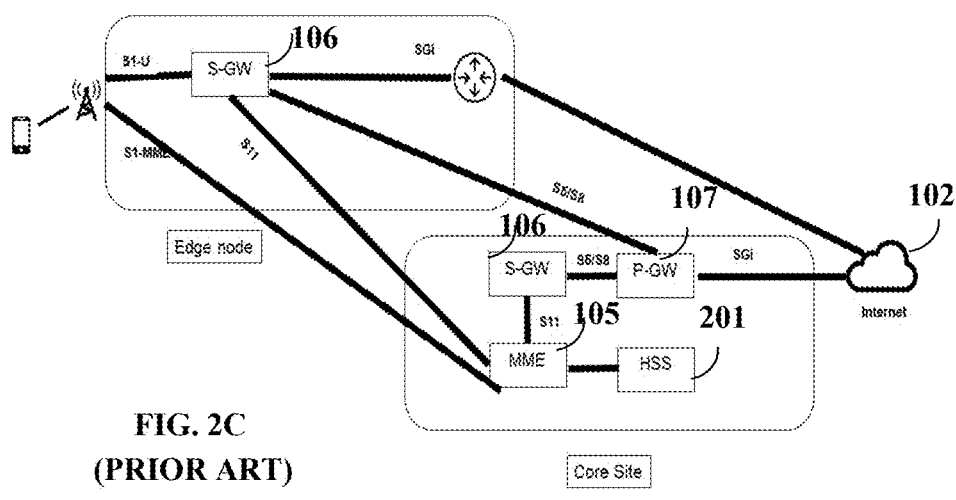
FIG. 2B
(PRIOR ART)
Edge node
FIG. 2C
(PRIOR ART)

LIGHT MOBILE CORE FOR NETWORKS

CROSS-REFERENCE TO RELATED PATENT APPLICATIONS

The present application claims the benefit of priority to Indian Patent Application number 202141038260, entitled "Light mobile core for networks" filed on Aug. 24, 2021, the entire contents of which are hereby incorporated by reference herein.

BACKGROUND

This invention generally relates to communication networks, and specifically refers to a light mobile core for edge networks.

In the existing art, the mobile core is deployed centrally. FIG. 1A illustrates the existing 3GPP defined 4G 101 network architecture (prior art). The UE (User Equipment) 110 connects to the eNode-B 108 and provides a data path 109 through the UE radio interface. The eNode-B 108 receives IP packets on the radio interface and then proceeds to append a GTP (GPRS Tunneling Protocol) Header to the packet and the appended packet to the S-GW (Serving Gateway) 107 through the S1 interface. This is performed for both Control packets as well as data packets. As for mobility packets, they are appended with GTP (GPRS Tunneling Protocol) Headers and sent to the MME 105 (Mobility Management Entity) over an S1-MME (Mobility Management Entity) Interface.

Both the MME (Mobility Management Entity) 105 and the S-GW (Serving Gateway) 107 actually remove the GTP (GPRS Tunneling Protocol) Header and process the IP packets. The data packets, for instance, are sent from the S-GW (Serving Gateway) 107 to the P-GW (Packet Data Network Gateway) 106 through the S5/S8 Interface, and from the P-GW 106 (Packet Data Network Gateway), onwards to the NAT (Network Address Translator), Firewall and eventually to the Internet 102. FIG. 1A additionally depicts existing AAA, PCRF, OCS, and OFCS 104.

FIG. 1B illustrates the existing 3GPP defined 5G 111 network architecture (prior art). The UE (User Equipment) 110 connects to the gNB 116 and provides a data path 109 through the N1 interface. The gNB 116 receives IP packets on the radio interface and then proceeds to append a GTP (GPRS Tunneling Protocol) Header to the packet and send it to the UPF 113 (User Plane Function) through the N3 interface. This is performed for data packets (for control and mobility packets, NGAP (NG Application Protocol) is used on the N2 Interface to send to an AUSF (Authentication Server Function)), FIG. 1B additionally depicts existing SMF 112, existing OSS components 114, and existing AMF 115.

The UPF (User Plane Function) 113 actually removes the GTP (GPRS Tunneling Protocol) Header and processes the IP packets. The data packets, for instance, are sent from the UPF 113 (User Plane Function) onwards to the NAT (Network Address Translator), Firewall and eventually to the Internet.

FIG. 2B illustrates a possible configuration in the existing art having a Core in every Edge site (prior art). This would be very costly from a resource point of view. FIG. 2B depicts HSS 201 provided within the core.

FIG. 2A illustrates a possible configuration in the existing art having only S-GW 106 (Serving Gateway) 107 and P-GW (Packet Data Network Gateway) at the Edge site and the MME (Mobility Management Entity) 105 at the Centralized core site (prior art). FIG. 2A depicts HSS 201 provided within the centralized core.

This would entail extending the S1-MME (Mobility Management Entity) and S11 Interfaces to every Edge site. This would also prove costly.

FIG. 2C illustrates a possible configuration in the existing art having only S-GW (Serving Gateway) at the Edge site and P-GW 107 (Packet Data Network Gateway), MME (Mobility Management Entity) 105 at the Centralized core site (prior art). FIG. 2C depicts HSS 201 provided within the centralized core.

The S1-MME (Mobility Management Entity), S11 and S5/S8 Interfaces all have to be extended to the Edge site. This solution also would be costly from resource utilization perspective as it needs a S-GW 106 (Serving Gateway) at every Edge site.

Thus, in any of the existing deployments, two data planes and two control planes in S-GW 106 (Serving Gateway) and P-GW (Packet Data Network Gateway) 107 are required. As a result of the S11 Interface extension, additional processing in the mobility and IP plane is required.

SUMMARY OF THE INVENTION

This summary is provided to introduce a selection of concepts in a simplified form that are further disclosed in the detailed description of the invention. This summary is not intended to determine the scope of the claimed subject matter.

Disclosed herein is a light mobile core that addresses the above mentioned challenges and requires less resources for deployment in 4G and 5G networks.

In 4G general deployments (prior art), both S-GW (Serving Gateway) and P-GW (Packet Data Network Gateway) are present at the edge node whereas in the light mobile core solution proposed herein, only P-GW (Packet Data Network Gateway) functionality is in the Edge Node.

In 5G, for UPF (User Plane Function) to offload traffic, UL CL (UpLink Classifier) parameters come from the SMF (Session Management Function), while the light mobile core solution simplifies that.

In addition, the light mobile core conforms to 3GPP.

Currently, the existing 4G and 5G deployments described in FIG. 1A, 1B, FIG. 2A, FIG. 2B and FIG. 2C have the classical end-to-end traffic that passes through the RAN and the core of the MNO before going to the Internet, which could result in higher latencies that could prove detrimental for some latency critical applications such as gaming. Also, the quality of experience (QoE) of the user could be greatly enhanced by having the content close to the user—and to achieve that, the light mobile core solution described in FIG. 3 and FIG. 4 separates the relevant traffic to reach the content server that is close to the user.

And further, the traffic that is getting offloaded at the RAN level itself without passing through the Mobile Network core would make the bandwidth requirements of the Mobile core much lighter, so that they need not have to be re-dimensioned when capacity (number of users) in the network needs to be added, or when any migration or upgrade of the network is done.

In an embodiment, the light mobile core comprises a memory unit and a processor. The processor is for example, a network processor. The memory unit is operably coupled to the processor. The memory unit comprises a client application comprising computer readable instructions of an application awareness algorithm. The computer readable instructions when executed by the processor cause the processor to sense inputs from one or more of a plurality of software applications.

In one or more embodiments, related systems comprise circuitry and/or programming for effecting the methods disclosed herein. The circuitry and/or programming can be any combination of hardware, software, and/or firmware configured to effect the methods disclosed herein depending upon the design choices of a system designer. Also, in an embodiment, various structural elements can be employed depending on the design choices of the system designer.

BRIEF DESCRIPTION OF THE DRAWINGS

The foregoing summary, as well as the following detailed description of the invention, is better understood when read in conjunction with the appended drawings. For illustrating the invention, exemplary constructions of the invention are shown in the drawings. However, the invention is not limited to the specific methods and structures disclosed herein. The description of a method step or a structure referenced by a numeral in a drawing is applicable to the description of that method step or structure shown by that same numeral in any subsequent drawing herein.

FIG. 2A illustrates a possible configuration in the existing art having only S-GW (Serving Gateway) and P-GW (Packet Data Network Gateway) at the Edge site and the MME (Mobility Management Entity) at the Centralized core site (prior art).

FIG. 2B illustrates a possible configuration in the existing art having a Core in every Edge site (prior art).

FIG. 2C illustrates a possible configuration in the existing art having only S-GW (Serving Gateway) at the Edge site and P-GW (Packet Data Network Gateway), MME (Mobility Management Entity) at the Centralized core site (prior art).

DETAILED DESCRIPTION OF THE INVENTION

Figure 1A:
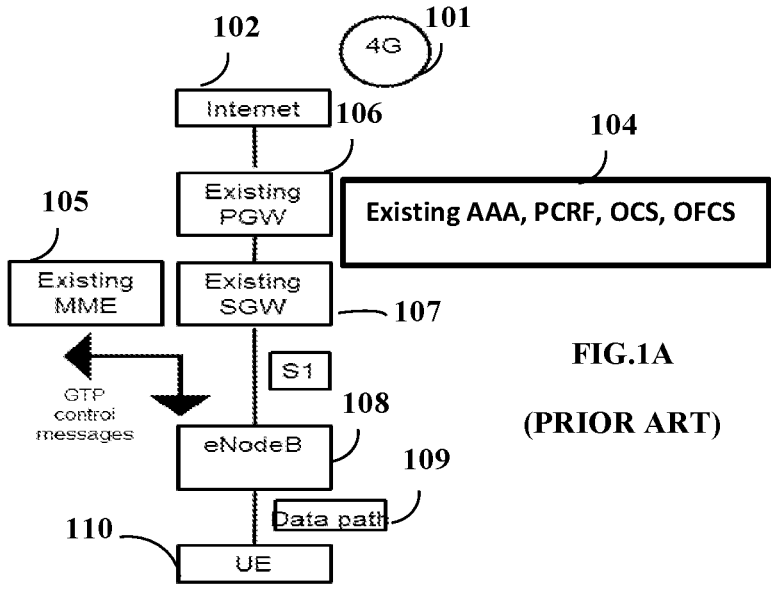
FIG. 1A illustrates the existing 3GPP defined 4G network architecture (prior art).
Figure 1B:
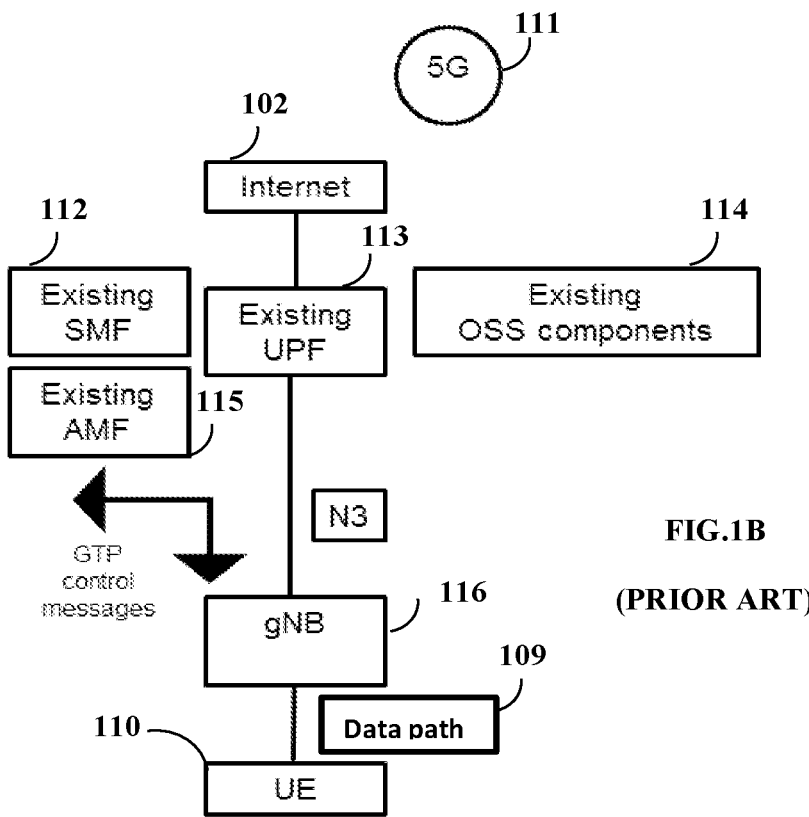
FIG. 1B illustrates the existing 3GPP defined 5G network architecture (prior art).
Figure 3:
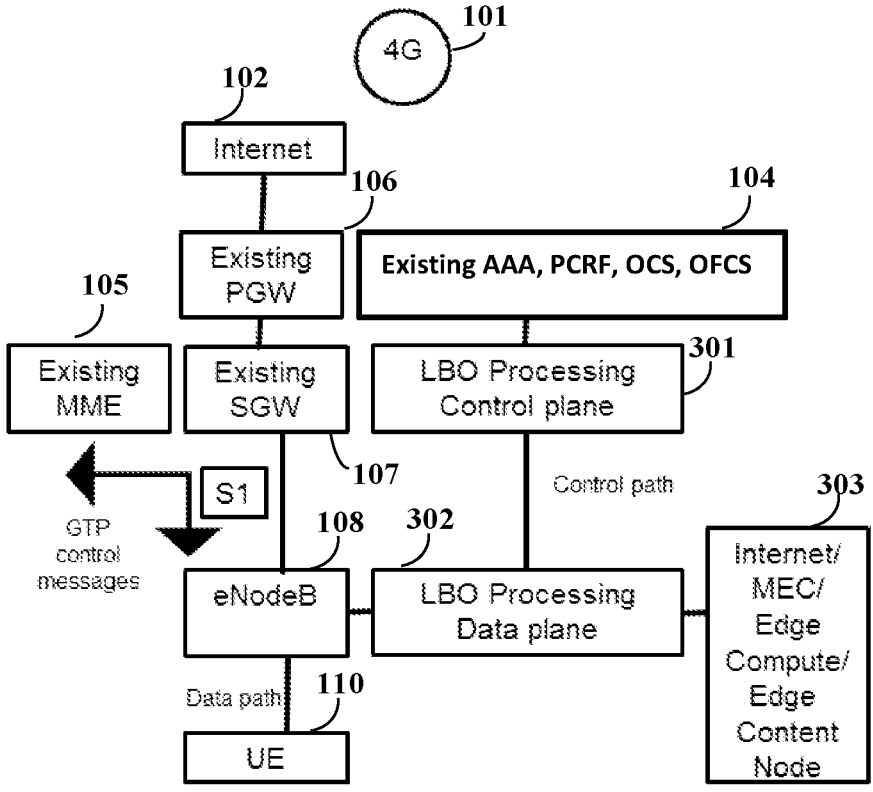
FIG. 3 illustrates the light mobile core deployment at the edge in a 4G network.

FIG. 3 illustrates the light mobile core deployment at the edge in a 4G network. In 4G general deployments (prior art), both S-GW (Serving Gateway) and P-GW (Packet Data Network Gateway) are present at the edge node whereas in solution described herein, only P-GW (Packet Data Network Gateway) functionality is in the Edge Node.

Figure 4:
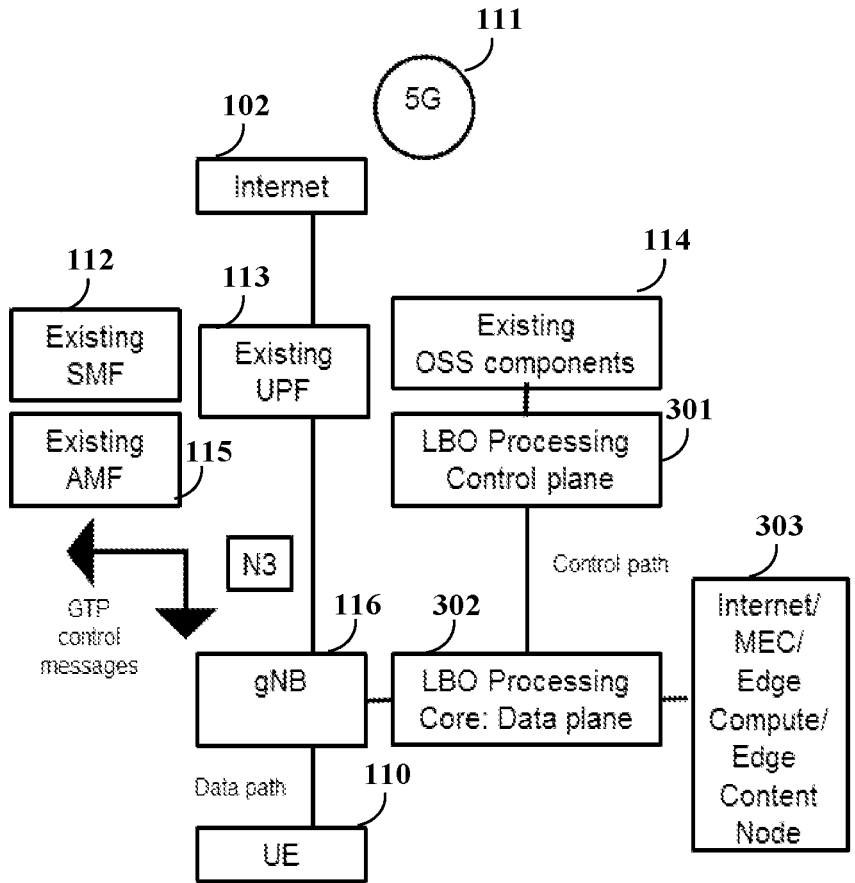
FIG. 4 illustrates the light mobile core deployment at the edge in a 5G network.

FIG. 4 illustrates the light mobile core deployment at the edge in a 5G network. In 5G deployments, for UPF (User Plane Function) to offload traffic, UL CL (UpLink Classifier) parameters come from the SMF (Session Management Function) while the solution disclosed herein has simplified the deployment.

Described herein is a light mobile core, for edge networks, that interconnects with eNodeB (4G) 101 or gNB (5G) 111 over an IP interface as opposed to the usual GTP (GPRS Tunneling Protocol) tunnel. The light mobile core maintains conformance with 3GPP standards and does not disrupt the S1 interface between eNodeB 108 and EPC (Evolved Packet Core) in 4G 101 networks and N3 interface between gNB 116 and core in 5G 111 networks. The light mobile core supports the full functionality of the 4G & 5G mobile cores.

The light mobile core has full Control and User Plane Separation (CUPS).

The control plane 301 of the light mobile core interfaces to the existing 4G 101 mobile core control plane using 3GPP DIAMETER stateful interfaces and to the existing 5G mobile core control plane using 3GPP REST (REpresentational State Transfer) API stateless interfaces. It interfaces to necessary third party systems through appropriate interfaces. It directs the data plane of the light mobile core suitably.

The data plane 302 of the light mobile core interfaces to eNodeB 108 (4G) or gNB 116 (5G) over a IP interface.

The control plane 301 deployment is described herein. The control plane 301 of the light mobile core is deployed at the mobile network edge, typically at the mobile cell site, as a software workload running on VM (Virtual Machine) or a container, along with the data plane 302 of the mobile core or at central site along with the mobile network OSS (Operations Support System)/BSS (Billing Support System) components. The control plane 301 is coupled to existing AAA, PCRF, OCS, and OFCS 104, as depicted in FIG. 3 and to existing OSS components 114, as depicted in FIG. 4. FIG. 4 additionally depicts existing SMF 112 and existing AMF 115.

The data plane 302 of light mobile core is deployed at the mobile network edge, typically at a mobile cell site. It is deployed as a software workload running on VM (Virtual Machine) or a container, along with eNodeB (4G) or gNB (5G) software.

The key functionality of the light mobile core is to offload mobile traffic at the edge, rather than have it ripple through the entire 4G or 5G network, to one of the following: Internet, MEC (Multi-Access Edge Compute) platform or a specialized edge cache or edge compute node.

As the UE (User Equipment) 110 or mobile offloads from one cell to another, in 4G or 5G, the traffic offload follows with appropriate policy and metering.

The offload is carried out in real time based on a complex policy that is driven from static and dynamic inputs from across the mobile ecosystem and various stakeholders. The offload is conducted on a per session basis, i.e. it is highly granular.

The light mobile core offloads traffic based on application based policies i.e. all designated application traffic is offloaded irrespective of the user identity or user based policies; i.e. all designated user traffic is offloaded irrespective of application identity, or a combination of both application and user based policies.

The data plane 302 of the light mobile core meters the offloaded traffic based on: (a) volume (b) time (c) event. This metering data is sent to the control plane 301 of the mobile core, which rates the traffic based on rate plans of: (a) mobile network operator (b) content provider (c) edge service provider The data plane 302 of the light mobile core enforces the following policy action: (a) blocking (b) prioritization (c) bandwidth shaping (d) traffic redirection (e) packet marking/header modification. The control plane 301 of the light mobile core directs the data plane 302, for the above mentioned policy actions. The policy plans are sourced from the following: (a) mobile network operator (b) content provider (c) edge service provider.

The offload decision and policy enforcement of the off-loaded traffic are driven by sensory inputs across the ecosystem spanning the subscriber, application, network and device dimensions.

The light mobile core provides full security functions, including acting as CGNAT (Carrier Grade Network Address Translator).

The light mobile core provides bidirectional support by handling both uplink and downlink mobile traffic.

The interface between the eNodeB 108 (4G) and gNB 116 (5G) and the light mobile core is specifically an IP interface over which both data plane 302 and control plane 301 messages pass.

The Control & User Plane Separation (CUPS) architecture is described herein. The control plane of the light core comprises the following components:

Interface module (Gx and Gy interfaces including CDR (Call Data Records) generation (4G), N4 interface (5G)).

Caching module (Session handling of all the UE (User Equipment) s and active data plane modules).
Housekeeping (Monitoring, High Availability)

The data plane 302 of the light core comprises the following components.

A policy handling component for undertaking blocking, priority, bandwidth shaping, redirection/traffic mirroring, and traffic marking/header modification.

A session management component for managing control and data plane session handling for the UE (User Equipment (s)).

A metering component for time-based, volume-based and event-based metering.

A housekeeping component for High Availability.

The deployment of the light mobile core services is described herein. The data plane 302 and control plane 301 elements of the light mobile core are micro-services architected software modules. These run as software workloads on VM (Virtual Machine) or containers.

The data plane component 302 is co-located with the eNodeB (4G) or gNB (5G) software workloads for reducing delay and optimizing performance. These entities communicate: (a) through the IP interface, when running on different VM (Virtual Machine) or containers (b) through IPC (Inter Process Communication) when running on the same VM (Virtual Machine) or containers.

The control plane 301 component is either co-located with a data plane 302 component or runs centrally in a cloud environment. The internal communication between the data plane 302 and control plane 301 is optimized to avoid overflow of internal traffic ("control storm").

The uplink offload services of the light mobile core is described herein. The data plane 302 of the light mobile core receives the user traffic (IP packet from the UE (User Equipment)) from the eNodeB (4G) 108 or gNB (5G) 116 and identifies the source IP and the destination IP. The source IP is the mobile IP unique to the UE (User Equipment) 110 or mobile user and the destination IP qualifies the application.

The light mobile core supports mapping. The source IP is mapped to the appropriate user identity (MSISDN (Mobile Station International Subscriber Directory Number)/IMSI (International Mobile Subscriber Identity)); and the destination IP is mapped to the appropriate application identity (APPID).

If the combination of the user identity (MSISDN (Mobile Station International Subscriber Directory Number)/IMSI (International Mobile Subscriber Identity)) and/or application identity (APPID) are matching with offload policy database, then that traffic is offloaded to: (a) Internet (b) MEC (Multi-Access Edge Compute) platform (c) Specialized edge cache or edge compute node 303.

The light mobile core provides session continuity & bi-directional support. The light mobile core picks up the session ID from control message component of the IP interface to the eNodeB (4G) 108 and gNB (5G) 116. This is stored in state machine and is used for: (a) maintaining session continuity when the UE (User Equipment) 110 moves one cell to the other (b) ensuring that downlink traffic goes to the right UE 110.

The light mobile core supports internet integrity; ensuring that the offloaded packet is properly processed by subsequent Internet routers and not rejected because of L3 address mismatch. The light mobile core overcomes this problem by using TUNTAP (network TUNnel network TAP) protocol and leveraging on the routing capabilities of the underlying OS (Operating System).

The downlink offload services of the light mobile core is described herein. Packet parsing: The data plane 302 of the light mobile core receives the user traffic (IP packet to the UE 110 (User Equipment)) from: (a) Internet (b) MEC (Multi-Access Edge Compute) platform (c) Specialized edge cache or edge compute node 303 and identifies the source IP and the destination IP. The source IP qualifies the application and the destination IP identifies the mobile network to which the UE 110 (User Equipment) belongs.

The download mapping function is described herein. The destination IP is translated to mobile IP that is unique to the UE (User Equipment) 110, using NAT (Network Address Translation). This mobile IP is then mapped to the appropriate user identity (MSISDN (Mobile Station International Subscriber Directory Number)/IMSI (International Mobile Subscriber Identity)). The source IP is mapped to the appropriate application identity (APPID).

The light mobile core offloads to the appropriate UE 110 (User Equipment). All the downlink traffic has to go from the light mobile core to the eNodeB (4G) or gNB (5G). However, the eNodeB (4G) 108 or gNB (5G) 116 needs the identity of the UE 110 (User Equipment) to which the packet has to be directed. The light mobile core provides that information to the eNodeB (4G) 108 or gNB (5G) 116 over the control message component of the IP interface, retrieved from the state machine.

The following parameters are to be mapped. Application mapping is described herein. For the offload, in the uplink and the downlink, the IP address has to be mapped to a particular APPID. This application mapping is essential for: (a) application based offload (b) metering such offloaded traffic properly (c) applying complex policy to the offloaded traffic. The IP address is sensed through packet parsing by the light mobile core.

The APPID is sensed as follows:
(a) The IP address is fed to the DNS (Domain name system) server to get the domain and the APP ID. (b) By analyzing the application protocol using DPI (Deep Packet Inspection). (c) From the mobile phone or the content/CDN (Content Delivery Network) servers, gathered by the control plane 301 of the light core.

The user identity mapping process is described herein. The different user identities: Mobile IP address, MSISDN (Mobile Station International Subscriber Directory Number) and IMSI (International Mobile Subscriber Identity) have to be mapped; this is essential for: (a) user based policy (b) getting the right policy and the rate plan for the offloaded traffic from the existing mobile network. The IP address (mobile IP) is sensed through packet parsing by the light mobile core. The MSISDN (Mobile Station International Subscriber Directory Number) & IMSI (International Mobile Subscriber Identity) are obtained, along with the appropriate policy and rate plan, as described in the "Sensing" section.

The sensory inputs needed for user identity mapping are obtained as follows:

The method and system for obtaining sensory inputs from OSS (Operations Support System) elements is described herein. The control plane 301 of the light mobile core communicates with the 3GPP AAA (Authentication Authorization and Accounting) or HSS (Home Subscriber Server) of the existing mobile network.

The control plane 301 of the light mobile core interfaces to 3GPP AAA (Authentication Authorization and Accounting) over S6-B and acts as a proxy 3GPP AAA (Authentication Authorization and Accounting). By being a proxy, the light mobile core listens to the S6-b messages and correlates the mobile IP address and MSISDN (Mobile Station International Subscriber Directory Number)/IMSI (International Mobile Subscriber Identity).

The control plane 301 of the light mobile core interfaces to HSS (Home Subscriber Server) over SOAP (Simple Object Access Protocol) or REST (REpresentational State Transfer) API interface; it feeds the mobile IP and gets MSISDN (Mobile Station International Subscriber Directory Number)/IMSI (International Mobile Subscriber Identity).

The control plane 301 of the light mobile core interfaces to AUSF (Authentication Server Function) in 5G to map the mobile IP and MSISDN (Mobile Station International Subscriber Directory Number)/IMSI (International Mobile Subscriber Identity).

The method of tapping into the mobile network is described herein. The mapping of the mobile IP & MSISDN (Mobile Station International Subscriber Directory Number)/IMSI (International Mobile Subscriber Identity) by tapping the following interfaces:

S11: GTP (GPRS Tunneling Protocol) interface between MME (Mobility Management Entity) & S-GW (Serving Gateway) in 4G; providing IMSI (International Mobile Subscriber Identity) & mobile IP S5: GTP (GPRS Tunneling Protocol) interface between P-GW (Packet Data Network Gateway) & S-GW (Serving Gateway) in 4G; providing IMSI (International Mobile Subscriber Identity) & mobile IP.

S1-C: SCTP (Stream Control Transmission Protocol) interface between eNodeB 108 & MME 105 (Mobility Management Entity) in 4G; this provides mobile IP; this is used to query the 3GPP AAA (Authentication Authorization and Accounting) or HSS (Home Subscriber Server) to get the MSISDN (Mobile Station International Subscriber Directory Number)/IMSI (International Mobile Subscriber Identity) mapping.

Gx: DIAMETER interface between P-GW (Packet Data Network Gateway) & PCRF (Policy and Charging Rules Function); IMSI (International Mobile Subscriber Identity)/MSISDN (Mobile Station International Subscriber Directory Number) & Mobile IP address are obtained.

5G: The data plane 302 of the light mobile core acts as an I-UPF (Intermediate User Plane Function) and gets the ready mapped data from the control plane 301 of the light mobile core, which in turn communicates to the SMF (Session Management Function) over the N4 interface.

The mobility between eNodeB (4G) and gNB (5G) is managed through:

4G: X2 messages flowing between eNodeB

5G: Xn messages flowing between gNB

The dynamic offload is driven by complex policy. The offload is done in real time, based on a complex policy that has a rigorous syntax, where the various policy conditions are linked by Boolean operators. The policy condition is programmed through a drag and drop GUI (Graphical User Interface). The offload policy is applied on a per session basis.

The offloading can be application based, user based or a combination of the two.

Application based offloading is described herein. All designated application traffic is offloaded irrespective of user identity. The applications which have to be offloaded are programmed through the GUI (Graphical User Interface) portal. If the traffic matches the applications selected, it is offloaded. Else, the light mobile core hands over the traffic back to the eNodeB (4G) 108 or gNB (5G) 116, which then passes it to the existing centralized mobile core. The light mobile core hands over the non-offload traffic very quickly to the eNodeB (4G) 108 or gNB (5G) 116, thereby reducing delay.

User based offloading is described herein. All designated user traffic is offloaded irrespective of application identity. The users who have to be offloaded are programmed through the GUI (Graphical User Interface) portal. If the traffic matches the user identity selected, it is offloaded. Else, the light mobile core hands over the traffic back to the eNodeB (4G) 108 or gNB (5G) 116, which then passes it to the existing centralized mobile core. The light mobile core hands over the non-offload traffic very quickly to the eNodeB (4G) 108 or gNB (5G) 116, thereby reducing delay.

A combination of the offloading function includes a mix of both of the above conditions and the complex policy is created through a drag and drop GUI (Graphical User Interface).

The metering and rating of offloaded traffic is described herein.

The data plane 302 of the light mobile core meters the offloaded traffic based on: (a) volume (b) time (c) event. This metering data is sent to the control plane 301 of the light mobile core, which rates the traffic based on rate plans of: (a) mobile network operator (b) content provider (c) edge service provider. CDR (Call Data Records) are generated which can be used by the mediation system of the mobile operator for offline and online billing.

As a first option, the rate plan is set by the existing mobile network; control plane of the light mobile core communicates with PCRF (Policy and Charging Rules Function) (4G) or SMF (Session Management Function)/PCF (Policy Control Function)/CHF (CHarging Function) (5G) over DIAMETER or PFCP (Packet Forwarding Control Protocol) interfaces.

As a second option, the rate plan is set by the content provider system through suitable API.

As a third option, the rate plan is set by the (a) mobile network operator (b) content provider (c) edge service provider using the drag and drop GUI (Graphical User Interface) in the portal.

The metering records are sent to the following:

(a) OCS (Online Charging System)/OFCS (Offline Charging System) (4G) or SMF (Session Management Function)/PCF (Policy Control Function)/CHF (Charging Function) (5G) over suitable interfaces for billing by the mobile operator (b) Rating/billing system of content providers for content based billing (c) Rating/billing system of the edge service provider for customized billing (d) User/end customer in case of direct retail billing The policy enforcement on offloaded traffic is described herein. The data plane 302 of the light mobile core enforces the following policy actions:

Blocking: The session is blocked based on the complex policy rule set through the drag and drop GUI (Graphical User Interface). This is essential for legal conformance and security.

Priority: The session is prioritized based on the complex policy rule set through the drag and drop GUI (Graphical User Interface). The prioritization reduces delay and is important for delay sensitive traffic Bandwidth shaping: The guaranteed bandwidth is allocated to the session based on the complex policy rule set through the drag and drop GUI (Graphical User Interface).

Re-direction/traffic mirroring: The session is re-directed to specific servers based on the complex policy rule set through the drag and drop GUI (Graphical User Interface). This is essential for edge or co-branded services; it is also used for lawful intercept.

Traffic marking/Header modification: The IP headers of the session are marked or modified as needed based the complex policy rule set through the drag and drop GUI (Graphical User Interface). This is needed for segment routing.

As a first option, the policy is set by the existing mobile network; control plane of the light mobile core communicates with PCRF (Policy and Charging Rules Function) (4G) or SMF (Session Management Function)/PCF (Policy Control Function) (5G) over DIAMETER or PFCP (Packet Forwarding Control Protocol) interfaces.

As a second option, the policy is set by the content provider system through suitable API As a third option, the policy is set by the (a) mobile network operator (b) content provider (c) edge service provider using the drag and drop GUI (Graphical User Interface) in the portal.

The light mobile core is driven by multi-dimensional sensory inputs, spanning the subscriber, application, network and device.

The inputs from the subscriber comprises identities within mobile network such as Mobile IP address, IMSI (International Mobile Subscriber Identity) and MSISDN (Mobile Station International Subscriber Directory Number); identities outside mobile network like customer ID in OTT (Over The Top) networks; address & demographics information.

The inputs from the application comprise APPID, usage statistics and QoS (Quality of Service)/QoE (Quality of Experience) parameters.

The inputs from the network comprise RAN (Radio Access Network) & core KPI (Key Performance Indicators), performance statistics and network loading.

The inputs from the device comprise identities such as IMEI (International Mobile Equipment Identity) & ICCID (Integrated Circuit Card ID), parameters such as OS (Operating System) type & version, memory etc. These sensory inputs are gathered from the mobile phone, content servers and the mobile network as follows.

In the case of the mobile phone, the sensory inputs are gathered through (a) APK (Android Package) (b) SDK (Software Development Kit) integrated with third party APK (Android Package) (c) SDK (Software Development Kit) integrated with the mobile OS (Operating System) (d) SDK (Software Development Kit) running on mobile phone chip.

The sensory inputs are gathered from Content/CDN (Content Delivery Network) servers through API.

The sensory inputs are gathered from the mobile network through (a) DPI (Deep Packet Inspection) data plane probe (b) Control plane query & response. This sensory information is correlated across time for different dimensions such as Subscriber, Application, Network, Device and different themes such as identity and QoS (Quality of Service)/QoE (Quality of Experience). These time slices are sequentially stored in a state machine.

The security in this distributed environment is provided through firewalls and CGNAT (Carrier Grade Network Address Translator).

The light mobile core conforms to 3GPP as follows:

Standard interface: The eNodeB (4G) 108 continues to communicate to the S-GW (Serving Gateway) (Serving Gateway) & EPC (Evolved Packet Core) over the S1 interface; The gNB (5G) 116 continues to communicate to the UPF (User Plane Function) & core over the N3 interface.

GTP (GPRS Tunneling Protocol) control messages: The GTP (GPRS Tunneling Protocol) control messages flow remains unchanged between the RAN (Radio Access Network) (4G & 5G) and core.

UE (User Equipment) Mobility: The UE (User Equipment) Mobility continues to be managed by MME (Mobility Management Entity) (4G) and AMF (5G).

It is apparent in different embodiments that the various methods, algorithms, and computer programs disclosed herein are implemented on non-transitory computer readable storage media appropriately programmed for computing devices. The non-transitory computer readable storage media participate in providing data, for example, instructions that are read by a computer, a processor or a similar device. In different embodiments, the "non-transitory computer readable storage media" also refer to a single medium or multiple media, for example, a centralized database, a distributed database, and/or associated caches and servers that store one or more sets of instructions that are read by a computer, a processor or a similar device. The "non-transitory computer readable storage media" also refer to any medium capable of storing or encoding a set of instructions for execution by a computer, a processor or a similar device and that causes a computer, a processor or a similar device to perform any one or more of the methods disclosed herein. Common forms of the non-transitory computer readable storage media comprise, for example, a floppy disk, a flexible disk, a hard disk, magnetic tape, a laser disc, a Blu-ray Disc® of the Blu-ray Disc Association, any magnetic medium, a compact disc-read only memory (CD-ROM), a digital versatile disc (DVD), any optical medium, a flash memory card, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read.

In an embodiment, the computer programs that implement the methods and algorithms disclosed herein are stored and transmitted using a variety of media, for example, the computer readable media in various manners. In an embodiment, hard-wired circuitry or custom hardware is used in place of, or in combination with, software instructions for implementing the processes of various embodiments. Therefore, the embodiments are not limited to any specific combination of hardware and software. The computer program codes comprising computer executable instructions can be implemented in any programming language. Examples of programming languages that can be used comprise C, C++, C#, Java®, JavaScript®, Fortran, Ruby, Perl®, Python®, Visual Basic®, hypertext preprocessor (PHP), Microsoft®.NET, Objective-C®, etc. Other object-oriented, functional, scripting, and/or logical programming languages can also be used. In an embodiment, the computer program codes or software programs are stored on or in one or more mediums as object code. In another embodiment, various aspects of the methods and the systems disclosed herein are implemented in a non-programmed environment comprising documents created, for example, in a hypertext markup language (HTML), an extensible markup language (XML), or other format that render aspects of a graphical user interface (GUI) or perform other functions, when viewed in a visual area or a window of a browser program. In another embodiment, various aspects of the methods and the systems disclosed herein are implemented as programmed elements, or non-programmed elements, or any suitable combination thereof.

The methods and the systems disclosed herein can be configured to work in a network environment comprising one or more computers that are in communication with one or more devices via a network. In an embodiment, the computers communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices comprises processors, examples of which are disclosed above, that are adapted to communicate with the computers. In an embodiment, each of the computers is equipped with a network communication device, for example, a network interface card, a modem, or other network connection device suitable for connecting to a network. Each of the computers and the devices executes an operating system, examples of which are disclosed above. While the operating system may differ depending on the type of computer, the operating system provides the appropriate communications protocols to establish communication links with the network. Any number and type of machines may be in communication with the computers.

The methods and the systems disclosed herein are not limited to a particular computer system platform, processor, operating system, or network. In an embodiment, one or more aspects of the methods and the systems disclosed herein are distributed among one or more computer systems, for example, servers configured to provide one or more services to one or more client computers, or to perform a complete task in a distributed system. For example, one or more aspects of the methods and the systems disclosed herein are performed on a client-server system that comprises components distributed among one or more server systems that perform multiple functions according to various embodiments. These components comprise, for example, executable, intermediate, or interpreted code, which communicate over a network using a communication protocol. The methods and the systems disclosed herein are not limited to be executable on any particular system or group of systems, and are not limited to any particular distributed architecture, network, or communication protocol.

We claim:

1. A method for communication in an edge network that interconnects with eNodeB or gNB, comprising of:
   providing a light mobile core that is interconnected to and located close to said edge network, wherein the light mobile core includes one of: P-GW or I-UPF functionality and does not include a S-GW, wherein the eNodeB (4G) or gNB (5G) is respectively interconnected to a S-GW or UPF via a first IP interface, and wherein the light mobile core is interconnected to said edge network via a second IP interface that is different from a GTP tunnel;

providing computer readable instructions in a memory unit of said light mobile core, wherein the computer readable instructions when executed by a processor of the light mobile core, cause the processor to perform steps comprising:

receiving traffic associated with a session; and applying criteria of an offload policy to the traffic, wherein:

based on a determination that the traffic meets the criteria of the offload policy, offloading mobile traffic at the edge to one of the following: Internet, MEC (Multi-Access Edge Compute) platform, or a specialized edge cache or edge compute node over the second IP interface; and based on a determination that the traffic does not meet criteria of the offload policy, passing the traffic to the eNodeB or gNB for transmission via the first IP interface.

2. The method of claim 1, wherein said light mobile core has full Control and User Plane Separation (CUPS).

3. The method of claim 1, wherein a control plane of the light mobile core communicates to an existing 4G mobile core control plane using 3GPP DIAMETER stateful interfaces, and communicates to an existing 5G mobile core control plane using 3GPP REST (REpresentational State Transfer) API stateless interfaces and wherein the control plane also communicates with necessary third party systems through appropriate interfaces.

4. The method of claim 1, wherein a data plane of the light mobile core communicates to eNodeB (4G) or gNB (5G) over an IP interface.

5. The method of claim 3, wherein said control plane directs a data plane of the light mobile core.

6. The method of claim 3, wherein the control plane of the light mobile core is deployed at a mobile network edge, typically at a mobile cell site, as software workload running on VM (Virtual Machine) or a container, along with data plane of the light mobile core, or at a central site along with mobile network OSS (Operations Support System)/BSS (Billing Support System) components.

7. The method of claim 4, wherein said data plane of the light mobile core is deployed at a mobile network edge, at a mobile cell site, as software workload running on a VM (Virtual Machine) or a container, along with eNodeB or gNB software.

8. The method of claim 1, wherein as a UE (User Equipment) or mobile moves from one cell to another, said traffic's offload follows with appropriate policy and metering in 4G or 5G.

9. The method of claim 1, wherein said traffic's offload and subsequent traffic management is carried out in real time.

10. The method of claim 1, wherein said traffic's offload is conducted on a per session basis.

11. The method of claim 1, wherein said light mobile core offloads said traffic based on application based policies or user identity based policies or a combination of both.

12. The method of claim 1, wherein a data plane of the light mobile core meters offloaded traffic based on volume, time, and event.

13. The method of claim 12, wherein said metered traffic is sent to a control plane of the light mobile core, wherein the control plane rates the traffic based on rate plans of a mobile network operator, content provider and edge service provider.

14. The method of claim 1, wherein a data plane of the light mobile core enforces policy actions of blocking, prioritization, bandwidth shaping, traffic redirection, and packet marking or header modification.

15. The method of claim 1, wherein offload decision and policy enforcement of said offloaded traffic are based on inputs received from a subscriber, an application, a mobile network, a mobile device, and combinations thereof.

16. The method of claim 1, wherein said light mobile core provides comprehensive security functions, including acting as CGNAT (Carrier Grade Network Address Translator).

17. The method of claim 1, wherein said light mobile core manages both uplink and downlink mobile traffic.

18. A system for communication in an edge network that interconnects with eNodeB or gNB, comprising:

a light mobile core that is interconnected to and located close to said edge network, wherein the light mobile core includes one of: P-GW or I-UPF functionality and does not include a S-GW, wherein the eNodeB or gNB is respectively interconnected to a S-GW or UPF via a first IP interface, wherein the light mobile core is interconnected to said edge network via a second IP interface that is different from a GTP tunnel, and wherein the light mobile core is configured to:

receive traffic associated with a session; and apply criteria of an offload policy to the traffic, wherein:

based on a determination that the traffic meets the criteria of the offload policy, offload mobile traffic at the edge to one of the following: Internet, MEC (Multi-Access Edge Compute) platform, or a specialized edge cache or edge compute node over the second IP interface; and based on a determination that the traffic does not meet criteria of the offload policy, passing the traffic to the eNodeB or gNB for transmission via the first IP interface.

19. The system of claim 18, further comprising a control plane component that comprises:

an interface module, comprising Gx and Gy interfaces including CDR (Call Data Records) generation (4G), N4 interface (5G));

a caching module for session handling of all user equipment and active data plane modules; and a housekeeping module for monitoring, with a high availability feature.

20. The system of claim 18, further comprising a data plane component that comprises:

a policy handling module for blocking, priority, bandwidth shaping, redirection or traffic mirroring, and traffic marking;

a session management module for managing control and data plane session handling for user equipment; and a metering module for time-based, volume-based and event-based metering.

\* \* \* \* \*